United States Patent [19]

Calmettes et al.

[11] Patent Number: 4,834,431
[45] Date of Patent: May 30, 1989

[54] CLAMP FOR JOINING TWO METAL PIPES

[75] Inventors: Lionel Calmettes; Michel André, both of Romorantin-Lanthenay, France

[73] Assignee: Etablissements Caillau, Issy-Les-Moulineaux, France

[21] Appl. No.: 223,621

[22] Filed: Jul. 25, 1988

[30] Foreign Application Priority Data

Jul. 30, 1987 [FR] France .................. 87 10844

[51] Int. Cl.⁴ .......................................... F16L 23/00
[52] U.S. Cl. ...................................... 285/410; 24/279
[58] Field of Search ............... 285/410, 411, 409, 408, 285/407, 367, 366; 24/279

[56] References Cited

U.S. PATENT DOCUMENTS

| | | | |
|---|---|---|---|
| 946,207 | 1/1910 | Doak | 285/410 |
| 2,663,582 | 12/1953 | Sebok | 285/410 |
| 2,693,380 | 11/1954 | Flanagan | |
| 2,699,343 | 1/1955 | Troeger et al. | 285/410 |
| 3,014,259 | 12/1961 | Joseph | 285/367 X |
| 3,964,773 | 6/1976 | Stade et al. | |
| 4,288,111 | 9/1981 | Feutz | 285/410 X |

FOREIGN PATENT DOCUMENTS 1031767 3/1953 France .
1010474 11/1965 United Kingdom ............... 285/367

Primary Examiner—Thomas F. Callaghan
Attorney, Agent, or Firm—Lewis H. Eslinger; Jay H. Maioli

[57] ABSTRACT

Clamp for joining two metal pipes, particularly of the type constituting the exhaust system of a vehicle engine, the ends in facing relationship of the two tubes to be joined having conical shape complementary bearing surfaces which project with respect to the cylindrical outer surface of the pipes. The clamp is constituted by an open ring of inverted V-shaped cross-section, the two ends of which ring comprise bearing elements for means provided for tightening and holding the ring in its closed position when the clamp has been placed over the pipes to be joined.

1 Claim, 1 Drawing Sheet

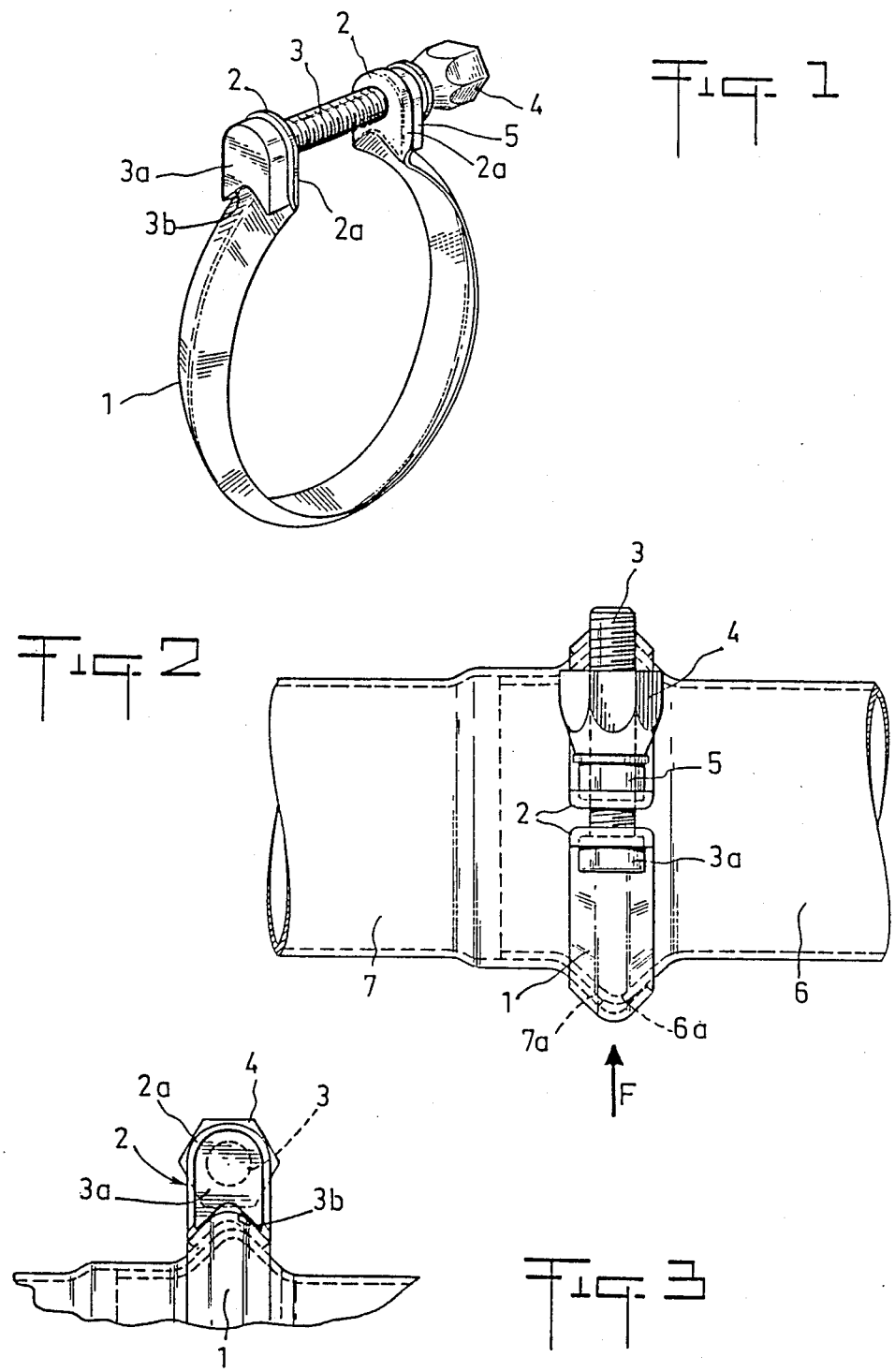

CLAMP FOR JOINING TWO METAL PIPES

FIELD OF THE INVENTION

The present invention relates to clamps for joining two metal pipes.

BACKGROUND OF THE INVENTION

It is known that the tight joining of two metal pipes can often raise difficulties, particularly if the joining means used are required to be as light as possible and quick-fittable. This is especially the case in the motor-vehicle industry, when the object is to produce an engine exhaust pipe with several sections of metal pipes.

It has already been proposed to this effect, for example in U.S. Pat. No. 3,964,773, to shape the facing ends of the pipes to be joined in such a way that they present complementary bearing surfaces of generally conical shape. A clamp is then placed around such conical surfaces which project with respect to the pipes outer surface, in order to hold them one against the other, thereby ensuring a tight connection as well as the necessary mechanical rigidity.

Such a clamp comprises two semi-circular elements of inverted V-shaped cross-section, adapted to fit over the projecting conical surfaces of the pipes.

Each semi-circular element is provided at its ends with flanges, which flanges are adapted to be assembled together by way of screws or bolts. In the case of the aforesaid U.S. patent, the semi-circular elements are provided at one of their ends with articulated joining means permitting the use of only one bolt for tightening the clamp.

This type of clamp takes a relatively long time to be fitted as it often requires the assembling and tightening of at least two bolts. Also, the tightening forces are unevenly used, and in particular, unevenly distributed, as they tend to bring closer together the two relatively rigid semi-circular elements, without exerting an even tension around their periphery.

French Pat. No. 3,91 031 767 has proposed the tight connecting of large diameter ventilation pipes by using an arrangement and a clamp similar to those described hereinabove. It is however noted that this patent requires the use of "reinforcing flanges" arranged in straddling fashion on the conical ends of the pipes to be joined, this making it virtually impossible to apply the teaching of said patent to joining pipes intended to constitute the exhaust system of a motor-vehicle.

It should finally be noted that the devices and arrangements briefly described in the foregoing generally require a seal, of rubber or similar material, interposed between the complementary bearing surfaces of the pipes. The presence of such a seal obviously complicates the operation of joining pipes, especially at the mass production level; there is also a source of inconvenience arising from the risks of the seal being damaged by hot and corrosive gases.

SUMMARY OF THE INVENTION

It is the object of the present invention to propose an improved clamp of the type such as briefly described hereinabove and permitting the instant tight joining-up of two metal pipes, total tightness being achieved particularly because of an improved utilization of the tightening forces. Being designed more particularly for the motorcar industry, such a clamp is relatively light and easy to fit, whether in "first assembly" in the factory, or in "second assembly" as spare parts.

However, before explaining in detail the means proposed by the invention for obtaining the desired results, it is important to mention the existence of U.S. Pat. No. 3,92,693,380. This document proposes a clamp which is solely adapted to hold, in an axial direction, the assembly of two members driven in rotation one by the other. To this end, the clamp is constituted by an open ring, of inverted V-shaped cross-section. This clamp is placed astride the conical sides of solid elements fixed on the members driven in rotation. It is essential for this type of clamp not to be subjected to twisting forces.

In order to keep the two members joined in axial direction, the inverted V-shaped cross-section of the clamp is made stable in shape with the help of reinforcing disks which do not interfere with the flexibility which the clamp is required to have in the peripheral direction when being fitted.

Having described this particular prior art relating to clamps with inverted V-shaped cross-section, the characteristics of the improved clamp with which the above-referred results can be obtained will now be specified.

According to the invention, the clamp is constituted, in a manner known per se, by an open ring of which the cross-section is sufficiently deformable to apply strongly, one against the other, the conical shape complementary bearing surfaces of the pipes; in addition, its free ends are provided with bearing elements which extend radially close as possible to the inner periphery of the ring in its closed position once the clamp has been placed on the pipes to be joined.

It is also advantageous for the two free ends of the ring which are constituted by radially arranged lug pieces, to be shaped so as to constitute housings providing bearing surfaces for the means used for tightening and holding the ring in its closed position.

The means for tightening and holding the ring in its closed position can be constituted, in known manner, by a nut and bolt system. The head of the bolt and an abutment slidably mounted on said bolt are then advantageously provided with V-cut grooves on their periphery, said grooves being designed to rest on the lug pieces of the ring, at least in the zone in which they are joined to the ring.

BRIEF DESCRIPTION OF THE DRAWINGS

The invention will be more readily understood on reading the following description of one example of embodiment given with reference to the accompanying drawings, in which:

FIG. 1 is a perspective view of a clamp according to the invention.

FIG. 2 is a view of a clamp such as shown in FIG. 1 mounted and tightened over two pipes to be joined.

FIG. 3 is a partial view taken along arrow F of FIG. 2.

DETAILED DESCRIPTION OF PREFERRED EMBODIMENT

Referring first to FIG. 1, this shows a clamp constituted by an open ring in metal (1), of inverted V-shaped cross-section. Such a clamp is generally produced by bending and shaping a flat sheet of metal. The thickness of the metal sheet is essentially determined to obtain a suitable resistance to the tensile stresses to which the clamp will be subjected during tightening. As will be observed hereinafter, it is in no way necessary—and could even be detrimental—to increase that thickness, which would increase as a result the rigidity of the clamp.

The open ring is provided at each one of its free ends with a lug (2) which is bent radially to project outwardly from the clamp. Conceivably, the clamp will be produced so that, in its closed position—i.e. when the two lugs (2) are applied one against the other, or at least when they are brought very close together—, its external diameter corresponds to that of the projecting conical surfaces of the pipes to be joined (FIG. 2).

The lugs (2) constitute bearing zones for complementary members provided for tightening and keeping the ring in its closed position. In the illustrated example, the complementary members are constituted by the conventional system of bolt (3) and nut (4) and, of course, the lugs (2) comprise perforations to allow engagement of the threaded end of the bolt.

However, as clearly illustrated in the figures, the lugs (2) are stiffened by an edge (2a) defining thus a housing, on the one hand, for the massive head (3a) of the bolt, and on the other hand, for an abutment (5) slidably mounted on the bolt, the nut (4) coming to rest against said slidable abutment.

It will also be noted that the head (3a) of the bolt is provided on its periphery with a V-cut groove (3b) corresponding to the cross-section of the ring (1), so that the bearing zone of the head (3a) on the corresponding lug (2) extends at least as far as the zone in which said lug is joined to the ring (1). The abutment (5), which is also massive, is of identical shape to that of the head (3a) of the bolt and rests on the other lug (2), at least in the zone in which said lug is joined to the ring (1).

For reasons which will become obvious further on, the perforation made in abutment (5) to allow engagement of the threaded end of the bolt (3) advantageously has a diameter as near as possible to the external diameter of the bolt thread, this enabling the bearing face of abutment (5) against the corresponding lug (2) to be always perpendicular to the bolt axis.

Conceivably, any conventional washer can be placed between nut (4) and abutment (5).

Referring now to FIGS. 2 and 3, it is obvious that the clamp has first been placed in its open position above the joining zone of the two pipes (6) and (7), so that its inner groove covers the projecting conical surfaces (6a) and (7a) of the pipes. Indeed, as already indicated, the projecting surface (6a) comprises two conical sides, whereas the end surface (7a) only has one conical side adapted to be applied on one of the sides of surface (6a). Bolt (3) is then engaged successively in the perforations of the lugs (2) until its head (3a) reaches into the housing of the corresponding lug (2) where it is immobilized in rotation, its V-cut groove (3b) then covering over the ring (1). Similarly, abutment (5), not visibly shown in FIG. 2, is engaged on the threaded end until said end reaches the other lug (2) and until its V-cut groove covers over the ring (1) in absolutely symmetrical manner with respect to the bolt head. It is then possible to tighten the clamp with the nut (4). Throughout this operation, the diameter of the ring reduces regularly and, if necessary, the V shape of its cross-section alters slightly, such that the conical sides in facing relationship to the projecting surfaces of pipes (6) and (7) are firmly pressed one against the other, thereby achieving the desired tightness and a perfect mechanical joining of the pipes.

To this effect, it is to be noted that, advantageously, the inner angle of the inverted V-shaped cross-section of the clamp will be considerably smaller, by at least 10° for example, than the angle formed by the inverted V-shaped conical sides of the projecting surfaces (6a) and (7a) of the pipes. For example, if the angle formed by the inverted V-shaped conical sides of the projecting surfaces (6a) and (7a) of the pipes reaches close to 90°, the inner angle of the inverted V-shaped cross-section of the clamp can itself be near 65°. In this case, if the diameter of the pipes is in the region of 50 mm, it has been found that a suitable tightness of the joining is obtained by applying a torque of around 3 m.DaN on the nut (4), if the threaded end of the bolt (3) has a diameter of *10* mm and a pitch equal to 1.5 mm.

Moreover, as clearly illustrated in FIGS. 2 and 3, the cone sides of the ring (1) have sufficiently small dimensions for their inner periphery not to reach the zone in which the cylindrical part of the pipes are joined to the projecting surfaces (6a) and (7a). This enables the cone sides facing the projecting surfaces to be applied firmly, particularly near their external periphery, in the region of the top of the inverted V of the ring (1).

A last point to be noted is that, because of the regular deformation of the clamp according to the invention throughout the tightening operation, it is possible to obtain a very high section modulus between the two pipes. This is due in particular to the fact that the clamping forces caused by the nut-and-bolt assembly are exerted directly on the ring, owing to the special shape of the head (3a) of the bolt and of the abutment (5) due to the presence of V-cut grooves. Said latter, coupled to the absence of play between the bolt and the slidable abutment, prevent the lugs (2) from deforming under the effect of tightening. The tightening operation can thus be continued until the clamp ring is completely or nearly closed, i.e. until the lugs (2) are pressed one against the other, or are very close to one another.

We claim:

1. Clamp for tightly joining two metal pipes, such as the pipes constituting the exhaust system of a vehicle engine, the ends in facing relationship of the two pipes to be joined having complementary bearing surfaces of conical shape which project with respect to the outer cylindrical face of the pipes, and said clamp being provided with an open ring of inverted V-shaped cross-section, said ring comprising two ends which are so shaped to constitute bearing elements in the form of lugs that extend radially to the interal periphery of the ring, and means for tightening and holding the ring in a closed position comprising a nut and bolt system, the head of the bolt having on its periphery a V-cut groove that corresponds to the cross-section of the ring, so as to rest against a first lug at least in the zone in which said first lug is joined with the ring, whereas an abutment is provided between the nut and a second lug, said abutment being of similar shape to that of the bolt head, being slidably mounted on the bolt, and being adapted to rest against said second lug, at least in the zone in which said second lug is joined with the ring.

* * * * *